United States Patent
Vyssotski et al.

(10) Patent No.: US 8,438,414 B2
(45) Date of Patent: *May 7, 2013

(54) METHOD TO IMPLEMENT A MONOTONIC COUNTER WITH REDUCED FLASH PART WEAR

(75) Inventors: Nikolai Vyssotski, Austin, TX (US); Allen C. Wynn, Round Rock, TX (US); John Hentosh, Pfulgerville, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,646

(22) Filed: May 18, 2012

(65) Prior Publication Data

US 2012/0230460 A1 Sep. 13, 2012

Related U.S. Application Data

(63) Continuation of application No. 12/102,345, filed on Apr. 14, 2008, now Pat. No. 8,195,973.

(51) Int. Cl.
*G06F 1/04* (2006.01)
*G11C 11/34* (2006.01)
*G06M 3/00* (2006.01)

(52) U.S. Cl.
USPC .......................... 713/502; 365/185.09; 377/26

(58) Field of Classification Search .................. 713/502; 365/185.09; 377/26
See application file for complete search history.

(56) References Cited

U.S. PATENT DOCUMENTS

| | | | |
|---|---|---|---|
| 5,181,231 A | 1/1993 | Parikh et al. |
| 6,084,935 A | 7/2000 | Mather |
| 6,249,562 B1 | 6/2001 | Wells |
| 6,836,853 B1 | 12/2004 | Dover et al. |
| 7,085,341 B2 | 8/2006 | Wells |
| 7,272,754 B2 | 9/2007 | Love et al. |
| 7,350,083 B2 | 3/2008 | Wells et al. |
| 7,389,425 B2 | 6/2008 | Hasbun et al. |
| 7,441,093 B2 | 10/2008 | Ganjoo et al. |
| 7,526,059 B1 | 4/2009 | Shen et al. |
| 7,679,961 B2 | 3/2010 | Lee et al. |
| 7,778,078 B2 | 8/2010 | Nagadomi et al. |
| 7,809,957 B2 | 10/2010 | Grawrock |
| 2004/0003189 A1 | 1/2004 | England et al. |
| 2004/0086073 A1 | 5/2004 | Wuidart et al. |
| 2004/0090839 A1 | 5/2004 | Wuidart |
| 2006/0133560 A1 | 6/2006 | Takagi |
| 2009/0193527 A1 | 7/2009 | Ashkenazi et al. |

*Primary Examiner* — Paul R Myers
*Assistant Examiner* — Christopher a Daley
(74) *Attorney, Agent, or Firm* — Larson Newman, LLP

(57) ABSTRACT

A method of using a counter stored in flash memory includes providing a base value field, a selector field, and a plurality of increment fields. The base value field represents a base value for the counter, and the selector field indicates a first one of the increment fields. The method further includes changing a bit of the first increment field from an erased value to a written value to indicate a change in a value stored in the counter.

20 Claims, 6 Drawing Sheets

METHOD TO IMPLEMENT A MONOTONIC COUNTER WITH REDUCED FLASH PART WEAR

CROSS REFERENCE TO RELATED APPLICATIONS

This application is a continuation of U.S. patent application Ser. No. 12/102,345, entitled "Method to Implement a Monotonic Counter with Reduced Flash Part Wear," filed on Apr. 14, 2008, the disclosure of which is hereby expressly incorporated by reference in its entirety.

FIELD OF THE DISCLOSURE

This disclosure generally relates to a method to implement a monotonic counter with reduced flash part wear.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Typically, computer systems rely on switch mode power supplies to assure the hardware interface between the available power sources (e.g. an AC power grid) and the information handling system components. Modern switch mode power supplies are required to achieve high efficiency performance in order to meet the increased demand for energy efficient power conversion solutions. One of the main factors affecting performance efficiency is the switching losses of the DC-DC converter primary transistor or transistors in the power supply. The power loss due to the switching process is proportional to the squared value of the bulk voltage and the switching frequency applied to the DC-DC converter. The power loss varies dramatically for topologies not using active power factor correction (PFC) and where the power supplies are subjected to a wide input voltage variation.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
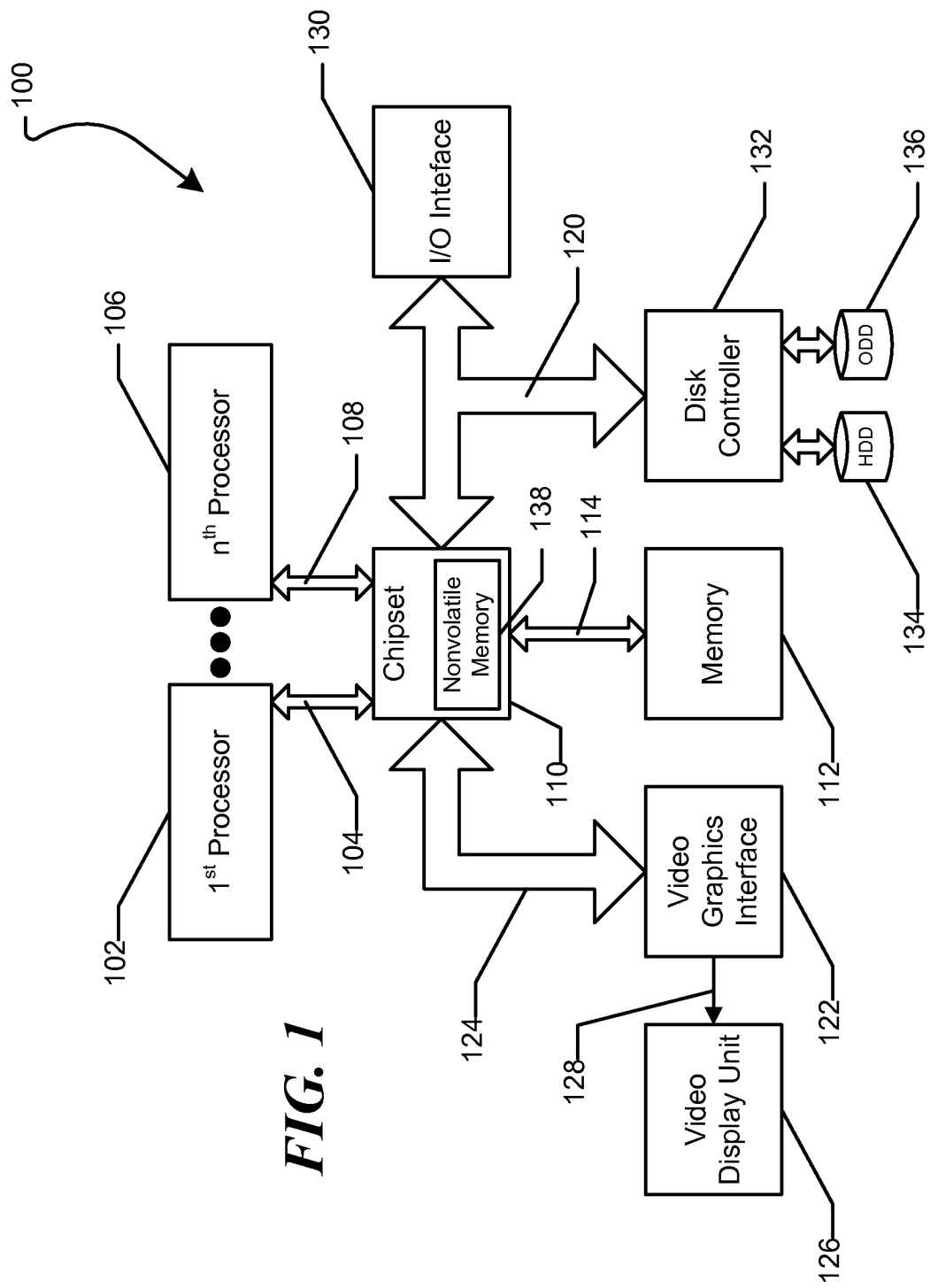
FIG. 1 is a block diagram illustrating an information handling system according to one aspect of the disclosure.

FIG. 1 illustrates a block diagram of an exemplary embodiment of an information handling system, generally designated at 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to $n^{th}$ host bus 108. The first physical processor 102 can be coupled to a chipset 110 via the first host bus 104. Further, the $n^{th}$ physical processor 106 can be coupled to the chipset 110 via the $n^{th}$ host bus 108. The chipset 110 can support multiple processors and can allow for simultaneous processing of multiple processors, and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/ output (I/O) controller hub. As a memory controller hub, the chipset 110 can function to provide access to first physical processor 102 using first bus 104 and $n^{th}$ physical processor 106 using the $n^{th}$ host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers among the buses 104, 108, and 114.

According to another aspect, the chipset 110 generally can be considered an application specific chipset that provides connectivity to various buses, and integrates other system functions. For example, the chipset 110 can be provided using an Intel® Hub Architecture (IHA) chipset that can also include two parts, a Graphics and Accelerated Graphics Port (AGP) Memory Controller Hub (GMCH) and an I/O Controller Hub (ICH). For example, an Intel 820E chipset, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an AGP interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using the first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

Additionally, the information handling system 100 can include a nonvolatile memory 138. The nonvolatile memory 138 can be implemented as a component of chipset 110. Alternatively, the nonvolatile memory 138 can be implemented as part of the memory 112. The nonvolatile memory may be flash memory such as a NAND flash or a NOR flash. Flash memory may have a limited number of erase cycles before performance degrades. To extend the life of the flash memory it may be desirable to reduce the number of erase operations. Erase operations can involve erasing a sector of the flash memory, i.e., transitioning all the bits in a sector from "0" to "1." Write operations transitioning bits from "1" to "0" may occur over a smaller number of bits, such as a byte. Typically, changing a value may involve erasing the sector to transition all bits to "1" and writing the new value to the byte by transitioning specific bits from "1" to "0." However, a byte may be rewritten without an intervening erase operation if the new value differs from the old value only by transitioning additional bits from "1" to "0."

The nonvolatile memory 138 can store nonvolatile variables in a variable pool. A nonvolatile variable may include a name, an attributes field, and a value. When the value of the nonvolatile variable is changed and the change only requires transitioning bits from "1" to "0," the variable may be rewritten without an erase operation. However, when the change requires transitioning bits from "0" to "1," a new instance of the variable may be written to another location within the variable pool to reduce the number of erase operations. Prior instances of the variable may be marked as expired, such as by changing a bit of the attributes field from "1" to "0." When the variable pool is exhausted and there is insufficient available space in the variable pool to create a new instance of the variable, the variable pool may be erased and a new instance of each variable containing the current value can be written to the variable pool.

Figure 2:
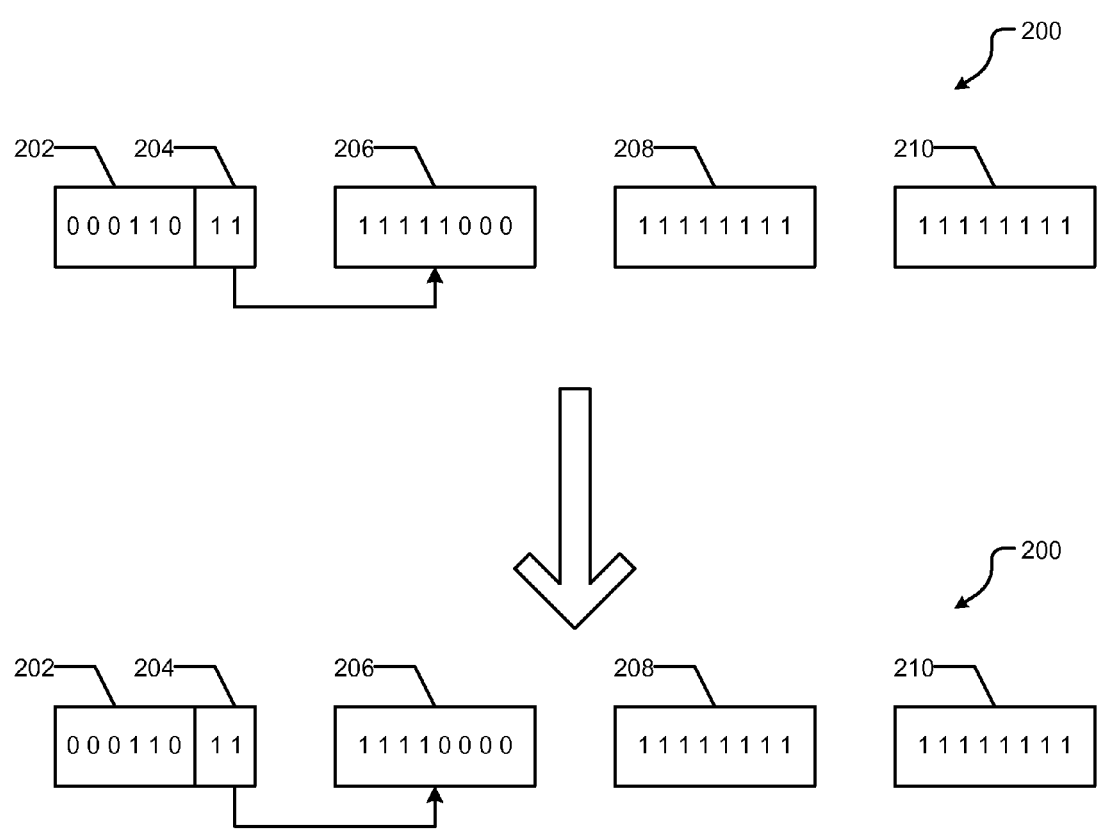
FIGS. 2 through 4 are schematic diagrams illustrating incrementing a flash counter according to aspects of the disclosure.

FIG. 2 illustrates incrementing an exemplary flash counter 200. Flash counter 200 can include a base value field 202, a selector field 204, and increment fields 206, 208, and 210. The base value field 202 can represent the base value of the flash counter 200. The base value is stored as a binary number having a number of lower order bits equal to the size of the selector field 204 truncated. For example, the value stored in the base value field 202 is 000110. The selector field 204 has two bits, so the corresponding binary number is 00011000, resulting in a base value of twenty-four. Selector field 204 indicates which of the increment fields 206, 208, or 210 is currently active. Each of increment fields 206, 208 and 210 can represent a value equal to the number of bits that have been changed from "1" to "0." For example, increment field 206 can initially store "11111000" representing an increment value of three.

In an exemplary embodiment, flash counter 200 can be a monotonic increasing counter that cannot be decremented. The value of flash counter 200 can correspond to the base value stored in the base value field 202 plus an offset value. The offset value can be the total number of "0" bits in the selector field 204 and the increment fields 206, 208, and 210. For example, the flash counter 200 can initially represent a base value of 24 and an offset value of 3 for a counter value of 27. When the flash counter 200 is incremented, increment field 206 may be incremented by changing an additional bit from "1" to "0" and the flash counter 200 can represent a new value of twenty-eight. The value of the counter can be rewritten without an erase operation when incrementing the counter does not require changing a bit from "0" to "1."

In an alternate embodiment, flash counter 200 can be a monotonic decreasing counter that cannot be incremented. The value of the flash counter 200 may be equal to the base value minus the offset value. For example, the flash counter 200 can initially represent a value of 21. When the flash counter is decremented, increment field 206 can be incremented by changing an additional bit from "1" to "0" and the flash counter 200 can represent a new value of twenty.

Figure 3:
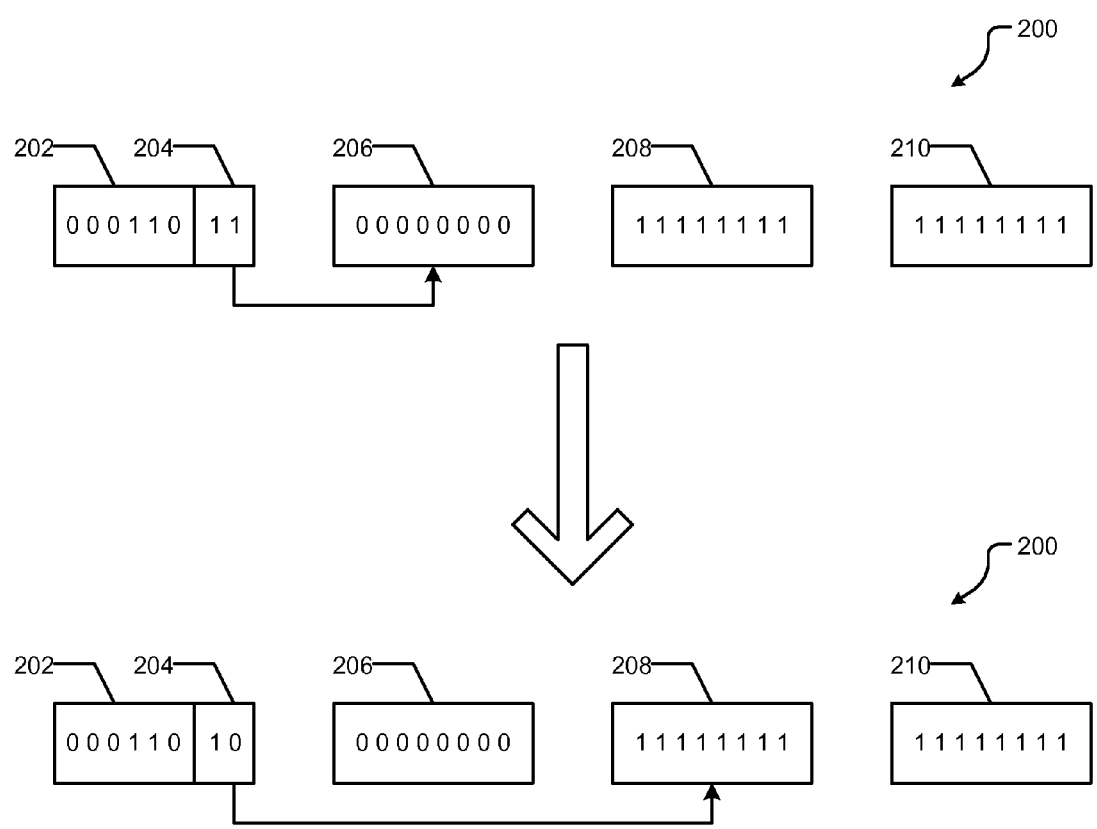

FIG. 3 illustrates flash counter 200 incrementing from a value of thirty-two to a value of thirty-three. Initially, the active increment field can be increment field 206 which may be storing a maximum value of eight. Incrementing flash counter 200 from thirty-two to thirty-three can require selection of the increment field 208 as the active increment field. The selection field can be incremented by changing a bit from "1" to "0," indicating the active increment field is increment field 208 and incrementing the counter. As incrementing the selection field 204 can increase the value stored in flash counter 200, increasing increment field 208 may not be necessary.

Figure 4:
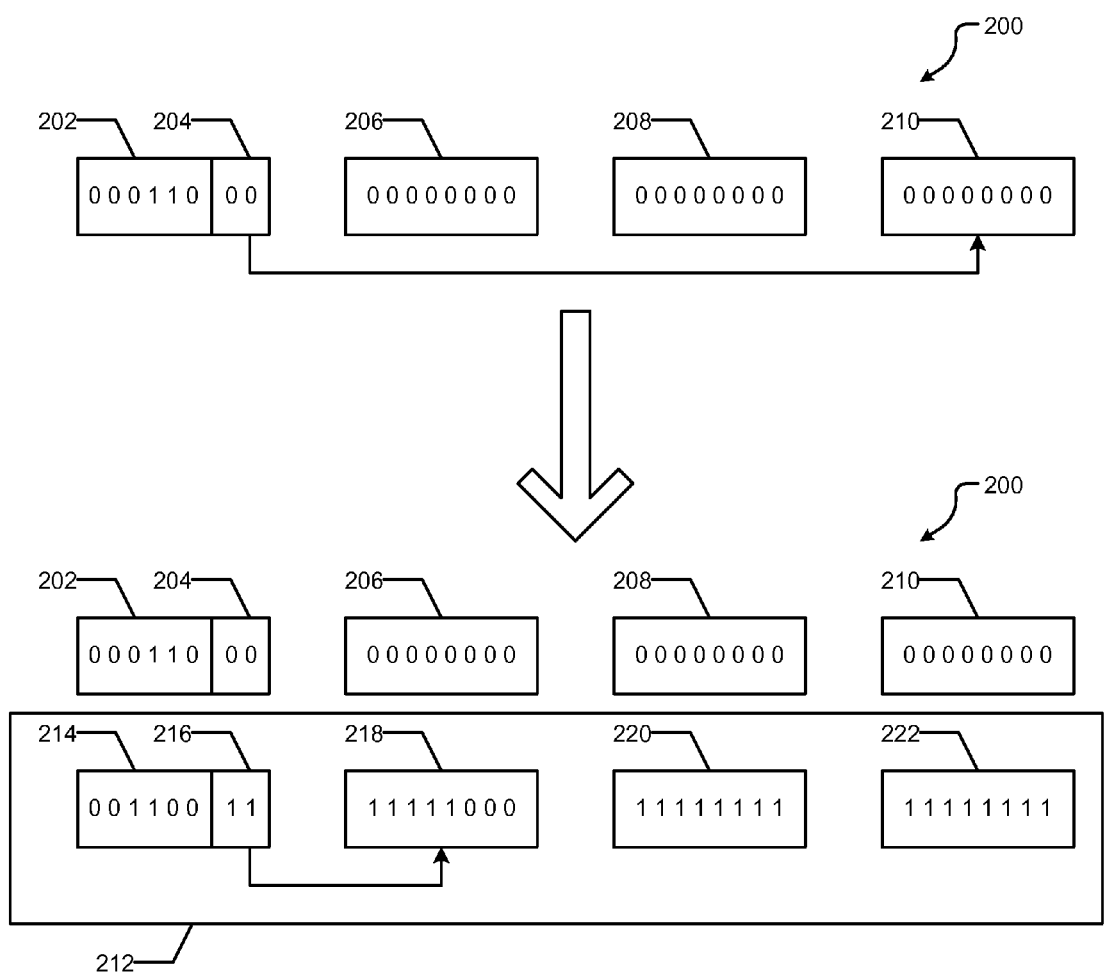

FIG. 4 illustrates flash counter 200 incrementing from a value of fifty to a value of fifty-one. Initially, flash counter 200 may be storing a maximum instance value, which is the maximum value possible without erasing flash counter 200. All the bits of selection field 204 may have a value of "0" indicating the active increment field is the last available increment field 210. Additionally, all the bits of each of the increment fields 206, 208, and 210 may have a value of "0" representing a maximum value of eight for each of increment fields 206, 208, and 210. To increment flash counter 200, the base value field 202, the selection field 204 and the increment fields 206, 208 and 210 may need to be erased. Additionally, a higher base value, forty-eight in this case, may need to be written to the base value field 202. When the variable pool has sufficient available space, a new instance 212 of flash counter 200 can be created rather than erasing the current instance of flash counter 200. New instance 212 can include a base value field 214 representing a new base value of forty-eight. Additionally, new instance 212 can include a selection field 218 and increment fields 218, 220, and 222. All the bits of selection field 218 can have a value of "1," indicating the active increment field is increment field 218. Additionally, increment field 218 can store a value of three, such that the value of the flash counter is fifty-one.

Figure 5:
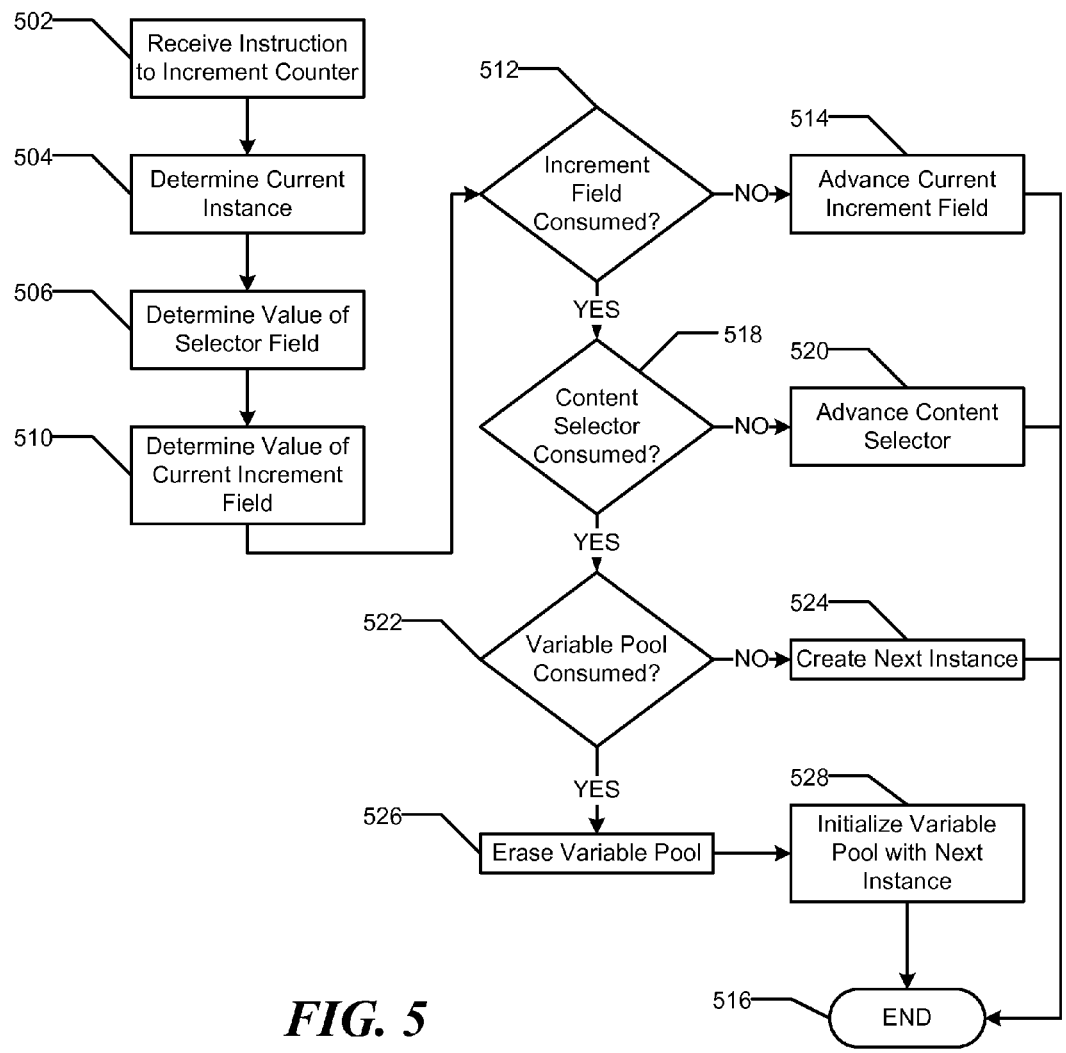
FIG. 5 is a flow diagram illustrating an exemplary method of incrementing a flash counter according to one aspect of the disclosure.

FIG. 5 illustrates an exemplary method of incrementing a flash counter, such as flash counter 200. At 502, a processor can receive an instruction to increment the value of the flash counter. At 504, the current instance of the flash counter can be determined. Determining the current instance of the flash counter may require reading through the variable pool until an instance of the flash counter is located with an attributes field indicating it is not expired. At 506, the value of the selector field may be determined. The value of the selector field can indicate which increment field is the active increment field. At 508, the value of the active increment field can be determined, such as by determining the number of written bits in the increment field. At 512, the processor may evaluate if the current increment field is consumed, such as when all the bits have a value of "0." When the current increment field is not consumed, the current increment field can be incremented as illustrated at 514 and the process may end at 516.

Alternatively, returning to 512, when the current increment field is consumed and all the bits have a value of "0," the current increment field stores a maximum value and the processor may determine if the selector field is consumed, as illustrated at 518. When the selector field is not consumed and at least a portion of the bits of the selector fields are "1," indicating additional increment fields are available, the selector field may be advanced, as illustrated at 520. The new value of the selector field can indicate the next available increment field is the active increment field and the process may end at 516.

Returning to 518, when the selector field is consumed and all the bits of the selector fields are "0," indicating no additional increment fields are available and the current flash counter instance is storing a maximum instance value, the processor may check to determine if the variable pool is consumed, as illustrated at 522. To determine if the variable pool is consumed, the processor may determine if sufficient space is available within the variable pool to create a next flash counter instance. At 524, when sufficient space is available, the processor can create the next instance of the flash counter having a larger base value and the process may end at 516.

Alternatively, returning to 522, when there is insufficient space available in the variable pool, the processor may erase the variable pool at 526. The processor may write the values of the variables to new instances of the variables within the erased variable pool, as illustrated at 528. The values of the variables may have been stored to a cache prior to erasing the variable pool. Additionally, the new instance of the flash counter may have a larger base value. The process may end at 516.

Figure 6:
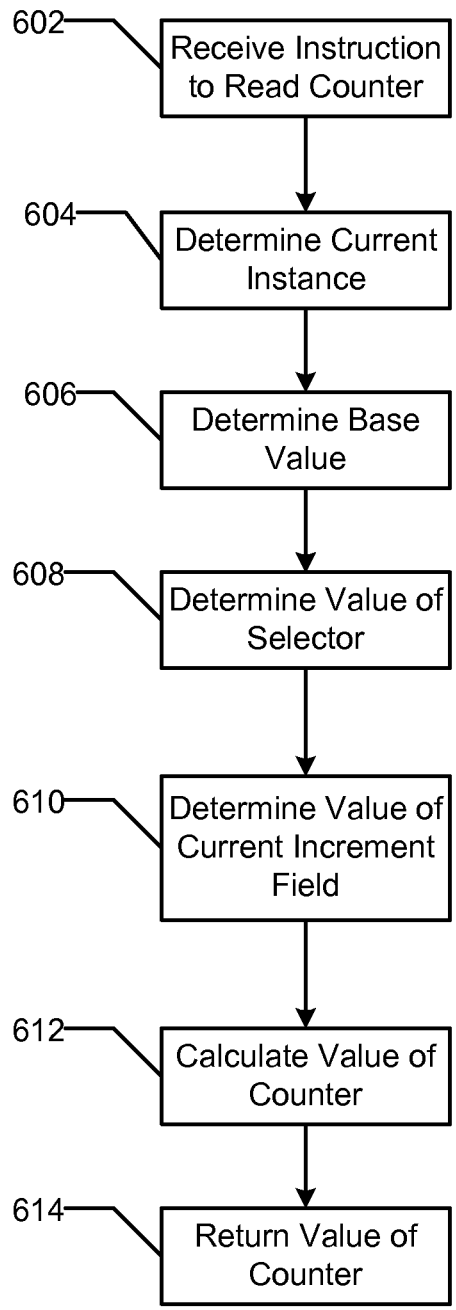
FIG. 6 is a flow diagram illustrating an exemplary method of determining the value stored in a flash counter according to one aspect of the disclosure.

FIG. 6 illustrates an exemplary method of reading the value of a flash counter, such as flash counter 200. At 602, a processor may receive an instruction to read the value from the flash counter. At 604, the current instance of the flash counter can be determined. Determining the current instance of the flash counter may require reading through the variable pool until an instance of the flash counter is located with an attributes field indicating it is not expired. At 606, the base value of the flash counter can be determined. The value of the flash counter can be determined by masking the value of the selection field. For example, if a 6-bit base value field and a 2-bit selection field are equal to "00011011," masking the 2-bit selection field can result in the binary number 00011000 representing a base value of twenty-four. The selection field may be masked using a bit-wise AND operation. At 608, the value of the selection field can be determined. The number of written bits in the selection field indicates which increment field is active, such as by using a shift operation. At 610, the value of the active increment field can be determined. The number of written bits in the increment field can be determined using a shift operation. At 612, the value of the counter may be calculated. For an incrementing flash counter, the value can be calculated by adding an offset value to the base value. Alternatively, for a decrementing flash counter, the value can be calculated by subtracting the offset value from the base value. The offset value, i.e. the number of written bits in the selector field and all of the increment fields, can be equal to the number of written bits of the selection field multiplied by nine plus the number of written bits in the active increment field. At 614, the value of the counter can be returned.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of using a counter stored in flash memory, comprising:
   providing a base value field, a selector field, and a plurality of increment fields within the counter, the base value field representing a base value for the counter, the selector field including a number of written bits to indicate a first one of the increment fields to be read during a determination of a value stored in the counter; and
   changing a bit of the first increment field from an erased value to a written value to indicate a change in the value stored in the counter.

2. The method of claim 1 further comprising changing a bit of the selector field from an erased value to a written value to indicate a second increment field when all the bits of the first increment fields have a written value.

3. The method of claim 2 wherein changing a bit of the selector field further indicates another change in the value stored in the counter.

4. The method of claim 2 further comprising creating a new instance of the counter when all the bits of the selector field and all the bits of the increment fields have a written value.

5. The method of claim 4 wherein the new instance of the counter has a larger offset value stored in the offset value field.

6. The method of claim 1 wherein the change is an increase in the value stored in the counter.

7. The method of claim 1 wherein the change is a decrease in the value stored in the counter.

8. A method of using a counter stored in flash memory, comprising:
   providing a base value field, a selector field, and a plurality of increment fields, the base value field representing a base value for the counter, the selector field indicating a first one of the increment fields;
   determining the base value from the base value field;
   reading a number of written bits in the selector field;
   determining a number of written bits in the first increment field;
   determining an offset value based on the number of written bits in the selector field and the number of written bits in the first increment field; and
   providing a counter value based on the base value and the offset value.

9. The method of claim 8 wherein the counter is an incrementing monotonic counter and the value is the base value plus the offset value.

10. The method of claim 8 wherein the counter is a decrementing monotonic counter and the value is the base value minus the offset value.

11. An information handling system including:
    a nonvolatile memory including a monotonic counter, the monotonic counter including a base value field, a selector field, and a plurality of increment fields, the base value field representing a base value for the counter, wherein a number of bits written in the selector field points to a first one of the increment fields; and
    a processor in communication with the nonvolatile memory, the processor configured to change a bit of the first increment field from an erased value to a written value to represent a change of a value stored in the monotonic counter.

12. The information handling system of claim 11 wherein the processor is further configured to change a bit of the selector field from an erased value to a written value to indicate a second increment field when all the bits of the first increment fields have a written value.

13. The information handling system of claim 12 wherein changing a bit of the selector field indicates a further change in the value stored in the counter.

14. The information handling system of claim 12 wherein the processor is further configured to create a new instance of the counter when all the bits of the selector field and all the bits of the increment fields have a written value.

15. The information handling system of claim 14 wherein the new instance of the counter has a larger offset value stored in the offset value field.

16. The information handling system of claim 11 wherein the change is an increase in the value stored in the counter.

17. The information handling system of claim 11 wherein the change is a decrease in the value stored in the counter.

18. The information handling system of claim 11 wherein the processor is further configured to:
    determine the base value from the base value field;
    determine an offset value based on the number of written bits in the selector field and a number of written bits in the increment fields; and
    calculate the value of the monotonic counter from the base value and the offset value.

19. The information handling system of claim 18 wherein the monotonic counter is an incrementing counter and the value is the base value plus the offset value.

20. The information handling system of claim 18 wherein the monotonic counter is a decrementing counter and the value is the base value minus the offset value.

* * * * *